United States Patent [19]

LaLande, Jr. et al.

[11] 3,789,088

[45] Jan. 29, 1974

[54] DIMERS OF HEXAFLUOROPROPENE AND PROPYLENE

[75] Inventors: William Alfred LaLande, Jr., Philadelphia; Murray Hauptschein, Glenside; Robert Bonner Hager, Collegeville, all of Pa.

[73] Assignee: Pennwalt Corporation, Philadelphia, Pa.

[22] Filed: May 24, 1971

[21] Appl. No.: 146,503

[52] U.S. Cl............ 260/648 F, 260/653.3, 252/73, 252/66, 252/364
[51] Int. Cl............................................. C07c 23/06
[58] Field of Search................................. 260/648 F

[56] References Cited
UNITED STATES PATENTS
3,662,009  5/1972  Hutchinson..................... 260/653.3

*Primary Examiner*—Daniel D. Horwitz
*Attorney, Agent, or Firm*—Stanley Litz

[57] ABSTRACT

Cis and trans-1-trifluoromethyl-1,2,2-trifluoro-4-methyl-cyclobutane and mixtures thereof are provided. These compositions are liquids having high dielectric constant and low freezing points, useful as working fluids for hydraulic systems and as inert solvents. Also provided are linear dimers, 4,4,5,6,6,6-hexafluorohexene-1 and 4,4,5,6,6,6-hexafluorohexene-2, useful as co-monomers in ethylene and propylene polymerization.

2 Claims, No Drawings

DIMERS OF HEXAFLUOROPROPENE AND PROPYLENE

The compositions of this invention are a mixture of cis-and trans-1-trifluoromethyl-1,2,2-trifluoro-4-methylcyclobutane, referred to as the mixed cyclic dimer or 1:1 cycloadducts of hexafluoropropene and propylene, the individual cyclic dimers, and the 1:1 linear adducts (or linear dimers) 4,4,5,6,6,6-hexafluorohexene-1 and 4,4,5,6,6,6-hexafluorohexene-2. These new compounds are produced by the thermally-promoted reaction of hexafluoropropene and propylene.

The cyclic compositions of this invention, 1-trifluoromethyl-1,2,2-trifluoro-4-methylcyclobutane,

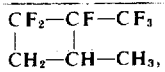

are produced as a mixture of the cis-isomer

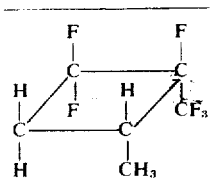

and the trans-isomer

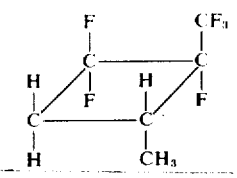

wherein the ratio of cis:trans isomer may be in the range of about 5:95 to 95:5. The individual cis - and trans - isomers can be isolated by gas chromatography separation techniques well known to those skilled in the art.

The hexafluoropropene-propene cyclic adducts embodied herein have certain unexpected physical characteristics which distinguish them from superficially structurally similar products, giving the new products a wider range of utility, including new and diverse uses. Their valuable and distinguishing properties are noted when compared to the cyclic dimer of hexafluoropropene (perfluorodimethylcyclobutane) disclosed in U.S. Pats. No. 2,957,032 and No. 3,316,312, and the cyclic dimer of tetrafluoroethylene and propylene (1-methyl-2,2,3,3-tetrafluorocyclobutane) described by D.D. Coffman et al., J.Am. Chem. Soc. 71, pp. 490–96 (1949). These differences are discussed in more detail later in this specification.

The compounds of this invention are prepared by bringing together the monomers hexafluoropropene and propylene, in mole ratios within the range of about 1:1 to 1:20, at reaction temperatures of from about 200°C. to about 800°C., preferably from 240° to 350°C. Reaction pressures can vary from one to about 500 atmospheres, but prefereably will be in the range of 50 to 200 atmospheres. The reaction may be carried out either continuously in a hot tube flow system or batchwise in a pressure vessel. Performing the reaction at lower temperatures, e.g., on the order of about 120°C., using di-tertiary-butyl peroxide as a catalyst, will favor the production of more of the linear, terminally unsaturated adduct.

The invention is clarified by the following illustrative example.

To a 2-gallon stainless steel, stirred autoclave cooled in a Dry Ice/acetone bath are charged 1,755 g. (11.7 moles) of perfluoropropene and 905 g. (21.5 moles) of propylene. The autoclave is sealed and heated for 24 hours at 250°C. with stirring. After cooling to room temperature, 1,631 g. of liquid and 906 g. of gas are recovered. Distillation of the liquid gives 1,361 g. (59% conversion) of the mixed dimer product of this invention. Mass spectral analysis shows the molecular weight to be 192, consistent with the stated structure. $F^{19}$ n.m.r. analysis gives the following data (expressed as ppm. from trifluoroacetic acid).

| Isomer | $CF_3$ | $CF_2$ | | | $CF$ |
|---|---|---|---|---|---|
| trans | +2.96 | 24.56, 28.36, | 29.59, | 33.4 | 116.5 |
| cis | −1.76 | 21.76, 25.58, | 39.09, | 42.89 | 94.94 | which is consistent with the structure given. The $CF_2$ bands are AB quartets with a geminal coupling constant of about 215 Hz. Infrared analysis shows absorbance as follows: Isomer    Bands
trans
3.31w, 3.34w, 3.39w, 3.45w, 6.75w, 6.8w, 7.25m, 7.5m, 7.6m, 8.1m, 8.21s, 8.42s, 10.2m, 10.5w, 13.5w, 15.6w microns
cis
3.31w, 3.34w, 3.39w, 3.45w, 6.75w, 6.8w, 7.25w, 7.5m, 7.6m, 8.1m, 8.35s, 8.5s, 8.8m, 10.45m, 13.4w, 15.0w microns
Anal. Calc'd. for $C_6H_6F_6$: C, 37.5; H, 3.13; F, 59.4
Found:    C, 37.2; H, 3.45; F, 60.1

The approximate ratio of the cis to trans isomer in this product is 1:1. The boiling point range of the dimer product is 84 to 90°C., with the cis-isomer being the higher boiling component. Other important physical properties of the 1-trifluoromethyl-1,2,2-trifluoro-4-methylcyclobutane are:

1. Critical Temperature = 250.3 ± 5°C.
2. Liquid density (g/ml) = $1.3791 - 1.9174 \times 10^{-3}t$ 23.6°C. $\leq t \leq$ 150.3°C. (1.3312 at 25°C.)
   Liquid density (g/ml) $4.8407 - 5.9063 \times 10^{-2}t + 3.170 \times 10^{-4}t^2 - 5.9748 \times 10^{-7}t^3$ 155°C. $\leq t \leq$ 239.8°C.
3. Sat. vapor density (g/ml) = $7.1963 \times 10^{-3}t - 5.6973 \times 10^{-7}t^3 + 1.515 \times 10^{-7}t^3 - 0.28585$ 100.2°C. $\leq t \leq$ 239.8°C.
4. The mean vapor and liquid density $(d_{liq} + d_{vap})/2$ $0.698096 - 9.6679 \times 10^{-4}t$ 23.6 $\leq t \leq$ 250.3°C.
5. The critical density is estimated to be 0.456 g/ml.
6. The index of refraction, $n_D^{25}$, is 1.3150
7. Three purified samples gave liquid dielectric constants = 17.8, 19.1, and 19.5 with dissipation factor less than $10^{-3}$. Average 18.8.
8. Vapor press is approximated by the relationship, $\log_{10} P_{torr} = 7.85650 - 1783.53689/T°K$
9. Glass point= −130°C.
10. Liquid range= 220°C.

Also produced in low yield by the above reaction and isolated by gas chromatography from a forecut of the cyclic adduct distillation are the novel ethylenic monomer $CH_2=CHCH_2CF_2CFHCF_3$, and the internally unsaturated product $CH_3CH=CHCF_2CFHCF_3$. These structures are confirmed by their proton and $F^{19}$ nmr spectra. This data is given below for neat samples, as obtained with external standards; trifluoroacetic acid for $F^{19}$ and 5% tetramethylsilane in chloroform.

ization which can be induced in a molecule is a sum of the polarization which can be induced in the electron cloud of the molecule ($P_E$) and that which can be induced through atomic polarizations (or atom displacements within the molecule) ($P_A$). In general, the small $P_A$ amounts to only 5-10% of the value of $P_E$ for radia-

| Compound | Group | Bands | Center (ppm) | Coupling consts (H,) |
|---|---|---|---|---|
| | $CF_3$ | Double quartet | −2.26 | $J_4 = 9.7$ $J_{ac} = 5.4$ |
| (b)<br>F<br>| (d) (e) (f) (g)<br>$CF_3—C—CF_2—CH_2—CH=CH_2$<br>(a) |<br>H<br>(c) | $CF_2$ | AB system with further couplings | 32.75 | Jgem = 269, chem shift of 1.7 ppm. |
| | → CF | Double sextuplet | 134.83 | Jbc 41 |
| | $CH_2$ | Triplet, each component a doubled doublet | 2.36 | Jde 17.5<br>Jef 5.5 |
| | $CH_2$ | Complex | 4.71 5.88 | |
| | → CH(C) | Complex—approx. a doubled sextuplet | 4.37 | Jbc 47 |
| | $CF_3$ | Double quartet | −2.28 | $J_4 = 10$<br>$J_2 = 6$ |
| (b)<br>F<br>| (d) (e) (f) (g)<br>$CF_3—C—CF_2—CH=CH—CH_3$<br>(a) |<br>H<br>(c) | —$CF_2$ | AB system with further couplings | 28.2, 32.9<br>35.2, 39.9 | Jgem = 267, chem. shift of 5.2 ppm. |
| | → CF | Double sextuplet | 133.3 | $J_{bc} = 41$ |
| | $CH_3$ | Singlet | 1.56 | |
| | —CH=CH— | Two singlets | 5.08, 5.18 | |
| | → CH | Complex, approx. a double sextuplet | 4.51 | $J_{bc} = 46$ |

The very low glass point and relatively high boiling point of the cyclic adduct of this invention gives it valuable utility as a working fluid for hydraulic systems and as a heat transfer fluid over a wide operable range of temperatures, especially as compared to the cyclic dimer of hexafluoropropene which freezes at only −30°C., and Coffman et al's cyclic adduct of tetrafluoroethylene and propylene which boils at just 68.5°C. The molar refractivity of the $TFE/C_3H_6$ adduct is 23.5 and that for the $HFP/C_3H_6$ adduct can be calculated from the experimental data by the relation, $$MR_D = [n_D^2 - 1/n_D^2 + 2] \cdot M/\rho$$

where $MR_D$ and $n_D$ are, respectively, the molar refractivity and the index of refraction for light at the wavelength of the sodium- D line (5,890 angstroms), M is the molecular weight, and $\rho$ is the density. Therefore, the molar refractivity is $$MR_D = [(1.3150)^2 - 1/(1.3150)^2 + 2] \cdot (192.104/1.3312) = 28.2$$

The average atomic refraction of the fluorine atom given by Coffman, et al. (Loc. cit.) as 1.08 is in error and should be 1.21. This is important only in comparing the experimental data. Using the (corrected) value of atomic refraction of Coffman et al. (Loc. cit), the theoretical value based upon the additivity of the atomic refractions (see S. Glasstone, Textbook of Physical Chemistry, 2nd Ed., p, 530) is 28.4. This agreement between the molar refractivity calculated from the expermimental data and that calculated from the additivity of atomic refractions is very good, and confirms the experimental data.

The cyclic dimer of the invention is further distinguished from the tetrafluoroethylene-propylene adduct by its polarizability which can be compared from calculations based on the molar refraction. The total polartion in the region of the sodium-D line. Light is an electromagnetic phenomenon and it is therefore not surprising that there is a relation between the molar refractivity and the total polarization which can be induced in a molecule, $$P_D = P_E + P_A \approx 1.1\ P_E$$
$$MR_D = [n_D^2 - 1/n_D^2 + 2] \cdot M/\rho = P_E \text{ (Glasstone: loc. cit., P.537)}$$

Therefore a ratio of the molar refractivities of two compounds should indicate the relative polarization which can be induced in the two molecules.

$MR_D$ for $HFP/C_3H_6/MR_D$ for $TFE/C_3H_6 = 28.2/23.5 = 1.20$

The $HFP/C_3H_6$ adduct is about 20% more polarizable than the $TFE/C_3H_6$ adduct and therefore a better solvent for polar, or ionic, solutes. In addition, the $HFP/C_3H_6$ adduct is thus a better solvent for organic reactions involving electron displacements. Conversely, the $HFP/C_3H_6$ adduct is a poorer solvent for purely covalent molecules than the $TFE/C_3H_6$ adduct, a property that can be used to advantage in working fluid applications.

In addition, the unexpectedly high dielectric constant (17-19) of the new dimer also gives it utility as an inert, non-functional solvent for fluoropolymer molecular weight determinations and fluorochemical reactions. The dielectric constant is of the same order as pyridine (12.3) and acetone (20.7), two commonly used reaction and cleaning solvents. A much lower value of the dielectric constant would be predicted, however, because a range of about 1 to 7 (vapor and liquid data) is obtained for such compounds as $CClF_3$, $CF_2Cl_2$, $CHCl_2F$, $CHClF_2$, $CH_3CF_3$ (a compound having the same ratio of H/F as the new compounds), $CH_3CClF_2$, $CF_3CH_2Cl$, and $CCl_2FCClF_2$. Solvents effects are demonstrated by the fact that acetone and ethanol are only slightly soluble in hexafluoropropene dimer, but are completely soluble in the new mixed dimer.

Further insight into the solvent properties is gained by a consideration of the dipole moment of the cyclic HFP/$C_3H_6$ adduct which may be estimated from the measured dielectric constant. The total polarization of any molecule at any instant in time is due to two factors: (1) the total polarization which can be induced in the molecule by an electrical field ($P_D$) and (2) the polarization which is inherent in the molecule because of its structure ($P_o$). The relation between the total polarization at any instant and the dielectric constant is given by the relation $P_D + P_o = D-1/D+2 \cdot M/\rho$ The value for $P_D$ may be obtained from $P_D = P_E + P_A \approx 1.1\ P_E = 1.1\ MR_o = 31.02$, and from the relation $P_o = 4/3\ \pi\ N\ \mu^2/kt$, where N = Avogadro's number, $6.02 \times 10^{23}$ molecules/mole, k = R/N = Boltzmann's constant, R = $8.314 \times 10^7$ ergs/mole/deg., T = absolute temperature, and $\mu$ = dipole moment of the molecule, It can be estimated that the dipole moment, $\mu$, is $2.13 \times 10^{-18}$ e.s. unit cm. or 2.13D. This relatively large dipole moment (acetone is 2.7, butylamine is 1.4, and water is 1.84) implies a polar molecule and is evidence that the HFP/$C_3H_6$ adduct has unusual solvent properties.

The linear adducts embodied herein, $CH_2=CHCH_2CF_2CFHCF_3$ and $CH_3CH=CHCF_2CFHCF_3$, are useful as comonomers in the preparation of ethylene and propylene polymers in amounts of up to about 20% by weight of the ethylene or propylene copolymer which is prepared by conventional polymerization techniques well known for the production of olefin polymers. The fluorinated comonomer gives the ethylene or propylene polymer better mechanical processing characteristics (improved extrudability and moldability), flame resistance, and increased resistance to solvents. The terminally unsaturated compound is the more preferred fluorinated comonomer because of its greater reactivity in the polymerization.

We claim:

1. A compound of the structure

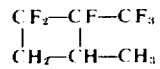

2. A mixture of cis- and trans-1-trifluoromethyl-1,2,2-trifluoro-4-methylcyclobutane.

* * * * *